US011169757B2

(12) United States Patent
Nakagawa

(10) Patent No.: US 11,169,757 B2
(45) Date of Patent: Nov. 9, 2021

(54) PRINT SERVER SYSTEM PROVIDING FUNCTIONS RELATED TO PRINTING

(71) Applicant: CANON KABUSHIKI KAISHA, Tokyo (JP)

(72) Inventor: Masashi Nakagawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/860,990

(22) Filed: Apr. 28, 2020

(65) Prior Publication Data
US 2020/0356317 A1  Nov. 12, 2020

(30) Foreign Application Priority Data
May 8, 2019  (JP) .............................. JP2019-088594

(51) Int. Cl.
*G06F 3/12* (2006.01)
(52) U.S. Cl.
CPC ............ *G06F 3/126* (2013.01); *G06F 3/1203* (2013.01); *G06F 3/1288* (2013.01)
(58) Field of Classification Search
None
See application file for complete search history.

(56) References Cited

U.S. PATENT DOCUMENTS

| | | | | |
|---|---|---|---|---|
| 6,301,012 B1* | 10/2001 | White | ................... | G06F 3/1204 358/1.15 |
| 8,743,405 B2* | 6/2014 | Oishi | .................... | G06F 3/1204 358/1.15 |
| 9,201,621 B2* | 12/2015 | Minagawa | ............ | G06F 3/1222 |
| 9,372,645 B2* | 6/2016 | Suzuki | ................. | G06F 3/1238 |
| 9,542,134 B2* | 1/2017 | Okumura | .............. | G06F 3/1289 |
| 9,671,982 B2* | 6/2017 | Lee | ........ | G06F 3/1288 |
| 9,710,207 B2* | 7/2017 | Takano | ................. | G06F 3/1229 |
| 2015/0160897 A1* | 6/2015 | Mori | ..................... | G06F 3/1292 358/1.13 |
| 2020/0356321 A1* | 11/2020 | Suzuki | .................... | G06F 3/126 |

FOREIGN PATENT DOCUMENTS

JP        2013-238924 A      11/2013

* cited by examiner

*Primary Examiner* — Paul F Payer
(74) *Attorney, Agent, or Firm* — Canon U.S.A., Inc. IP Division

(57) ABSTRACT

In a case where a print queue is registered in a cloud service, a common print queue is generated and registered with respect to a plurality of image forming apparatuses separately from a print queue with respect to a specific image forming apparatus. In a case where printing is performed on the common print queue at a time of printing, a print job is held in the cloud service and is transmitted after being authenticated by an image forming apparatus corresponding to the common print queue.

7 Claims, 15 Drawing Sheets

FIG.5

| DEVICE NAME | HWID | CategoryID | IP ADDRESS |
|---|---|---|---|
| Can iR-ADV CCCC | iR-ADV_CCCC61B1 | CanOIP | xxx.xxx.xxx.001 |
| Can iR-ADV XXXX | iR-ADV_XXXXD80D | CanOIP | xxx.xxx.xxx.111 |
| Can MF WWWW | MF_WWWWD43F | CanOIP | xxx.xxx.xxx.112 |
| Can LBP VVVV | LBP_VVVVV7547 | CanOIP | xxx.xxx.xxx.113 |
| Can OIP Common Printer | — | CanOIP | — |
| Can MP DDDD | MP_DDDD5E25 | CanIJ | xxx.xxx.xxx.120 |
| Can IJ Common Printer | — | CanIJ | — |
| AAAA BBBB | AAAACF39 | AAAA | xxx.xxx.xxx.222 |
| AAAA Common Printer | — | AAAA | — |
| YYYY ZZZZ | YYYY62B5 | YYYY | xxx.xxx.xxx.234 |
| YYYY Common Printer | — | YYYY | — |

FIG.7

```
<p: PrinterElements>
  <p: ElementData p: Valid = "true" p: Name = "p: PrinterDescription">
    <p: PrinterDescription><p: ColorSupported> true </p: ColorSupported>   ← 701
    <p: DeviceId>MFG: Can; MDL: iR-ADV CCCC; CLS: PRINTER; DES: Can iR-ADV CCCC; CID: CA_OIP_COMMON; CMD: LIPSLX, PS, PostScript, PCL, PJL, CPCA; </p: DeviceId>
    <p: MultipleDocumentJobsSupported> false </p: MultipleDocumentJobsSupported>
    <p: PagesPerMinute> 60 </p: PagesPerMinute>
    <p: PagesPerMinuteColor> 60 </p: PagesPerMinuteColor>
    <p: PrinterName xml: lang = "ja"> Can iR-ADV CCCC </p: PrinterName>
    <p: PrinterInfo xml: lang = "ja"> Can Pull Print Printer </p: PrinterInfo>
    <p: PrinterLocation xml: lang = "ja"> B1 - 4F </p: PrinterLocation>
    <p2: SupportsWSPrintV20> true </p2: SupportsWSPrintV20>
  </p: PrinterDescription>
</p: ElementData>
```

700 points to the DeviceId line; 702 highlights `CID: CA_OIP_COMMON`

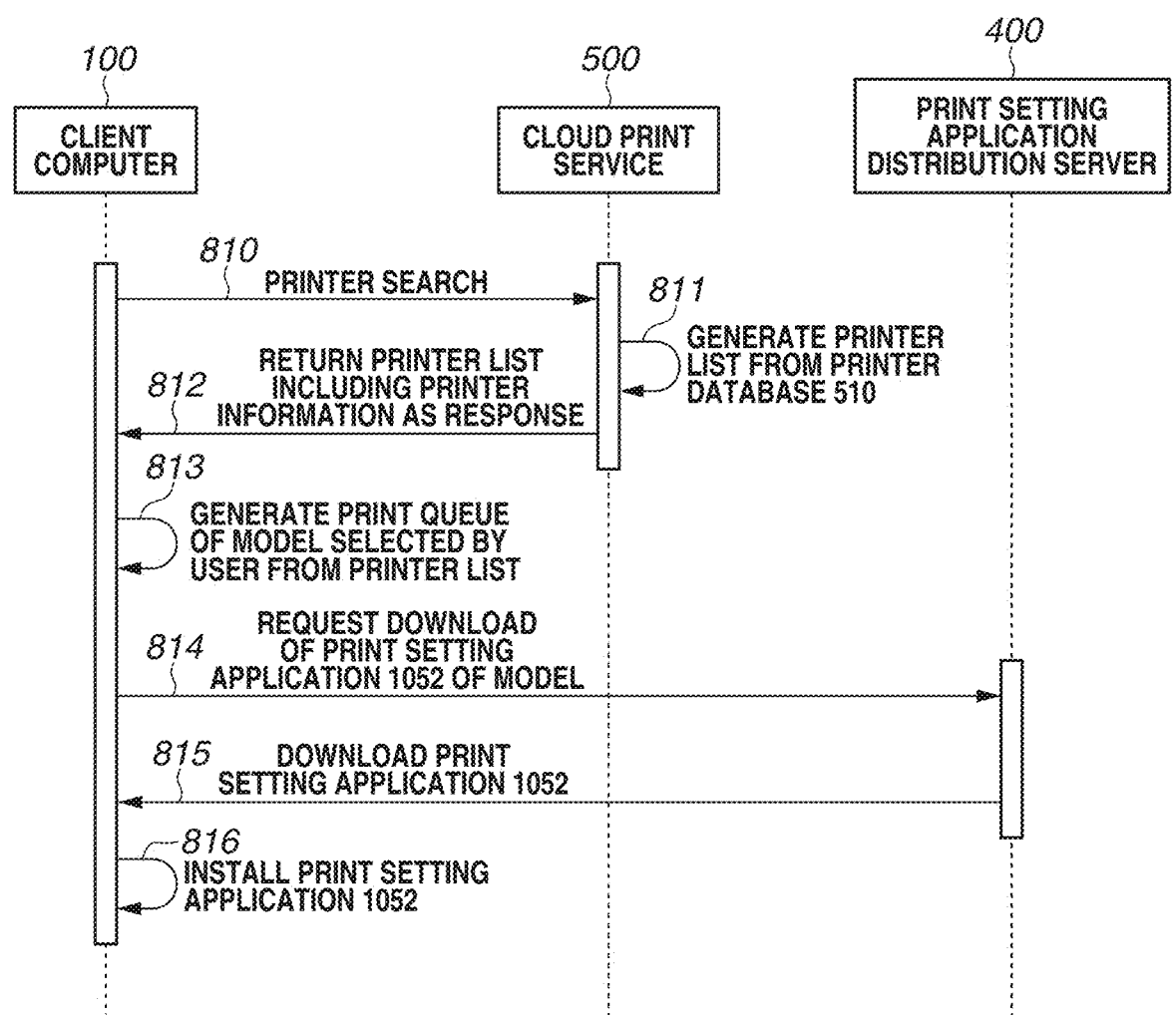

FIG.10

| PRINT JOB ID | PRINT JOB NAME | CategoryID |
|---|---|---|
| 1 | aaa.doc | CanOIP |
| 2 | bbb.xls | CanIJ |
| 3 | ccc.pptx | AAAA |
| 4 | ddd.doc | CanOIP |
| 5 | eee.pdf | CanOIP |
| 6 | fff.pptx | CanIJ |
| 7 | ggg.xps | AAAA |
| 8 | hhh.doc | CanOIP |
| 9 | iii.pptx | YYYY |
| 10 | jjj.pdf | CanOIP |
| 11 | kkk.pdf | YYYY |

FIG.12

| PRINT JOB ID | PRINT JOB NAME | CategoryID |
|---|---|---|
| 1 | aaa.doc | CanOIP |
| 4 | ddd.doc | CanOIP |
| 5 | eee.pdf | CanOIP |
| 8 | hhh.doc | CanOIP |
| 10 | jjj.pdf | CanOIP |

FIG.13

| CLOUD PRINT SERVICE | | | | | | |
|---|---|---|---|---|---|---|
| Taro Yamada | | UPDATE | NUMBER OF DOCUMENTS 5 | | | |
| DOCUMENT NAME | COLOR MODE | TWO-SIDED | PAGE AGGREGATION | NUMBER OF COPIES | DATE / TIME | |
| ■ aaa.doc | COLOR | ONE-SIDED | 1 in 1 | ONE COPY | 01 / 14 10 : 19 | |
| ☐ ddd.doc | MONOCHROME | ONE-SIDED | 1 in 1 | 5 COPIES | 01 / 14 10 : 19 | |
| ☐ eee.pdf | MONOCHROME | TWO-SIDED | 1 in 1 | ONE COPY | 01 / 14 10 : 19 | |
| ☐ hhh.doc | COLOR | ONE-SIDED | 1 in 1 | ONE COPY | 01 / 14 10 : 20 | |
| ☐ jjj.pdf | MONOCHROME | ONE-SIDED | 1 in 1 | ONE COPY | 01 / 14 10 : 20 | |

| SELECT ALL | CLEAR SELECTION | ERASE | | PRINT |
|---|---|---|---|---|

LOG OUT

PRINT SERVER SYSTEM PROVIDING FUNCTIONS RELATED TO PRINTING

BACKGROUND

Field of the Disclosure

The present disclosure relates to a printing apparatus in a print server system and a control method.

Description of the Related Art

Cloud print such as Google Cloud Print is known (Japanese Patent Application Laid-Open No. 2013-238924).

SUMMARY

A server system includes an obtainment unit configured to obtain identification information common to a plurality of image forming apparatuses from a first image forming apparatus and a generation unit configured to generate a print queue associated with the obtained identification information, wherein the obtainment unit obtains identification information same as the identification information from a second image forming apparatus, which is different from the first image forming apparatus, and wherein the server system further comprises a transmission unit configured to transmit information about a print job managed by the generated print queue to the second image forming apparatus from which the obtainment unit obtains the same identification information.

Further features of the present disclosure will become apparent from the following description of exemplary embodiments with reference to the attached drawings.

BRIEF DESCRIPTION OF THE DRAWINGS

FIG. 5 illustrates an example of an information database of the printer, which is stored in the cloud print service.

FIG. 7 illustrates an example of device information to be obtained from the printer in the cloud print service.

FIG. 8 is a sequence diagram for installing a print setting application on a client computer.

FIG. 10 illustrates an example of a print job database stored in a print job storage area in the cloud print service.

FIG. 12 illustrates an example of a print job list that can be printed by the printer as a request source in the cloud print service.

FIG. 13 illustrates an example of an operation panel displaying a printable job list received from the cloud print service.

DESCRIPTION OF THE EMBODIMENTS

Figure 1:
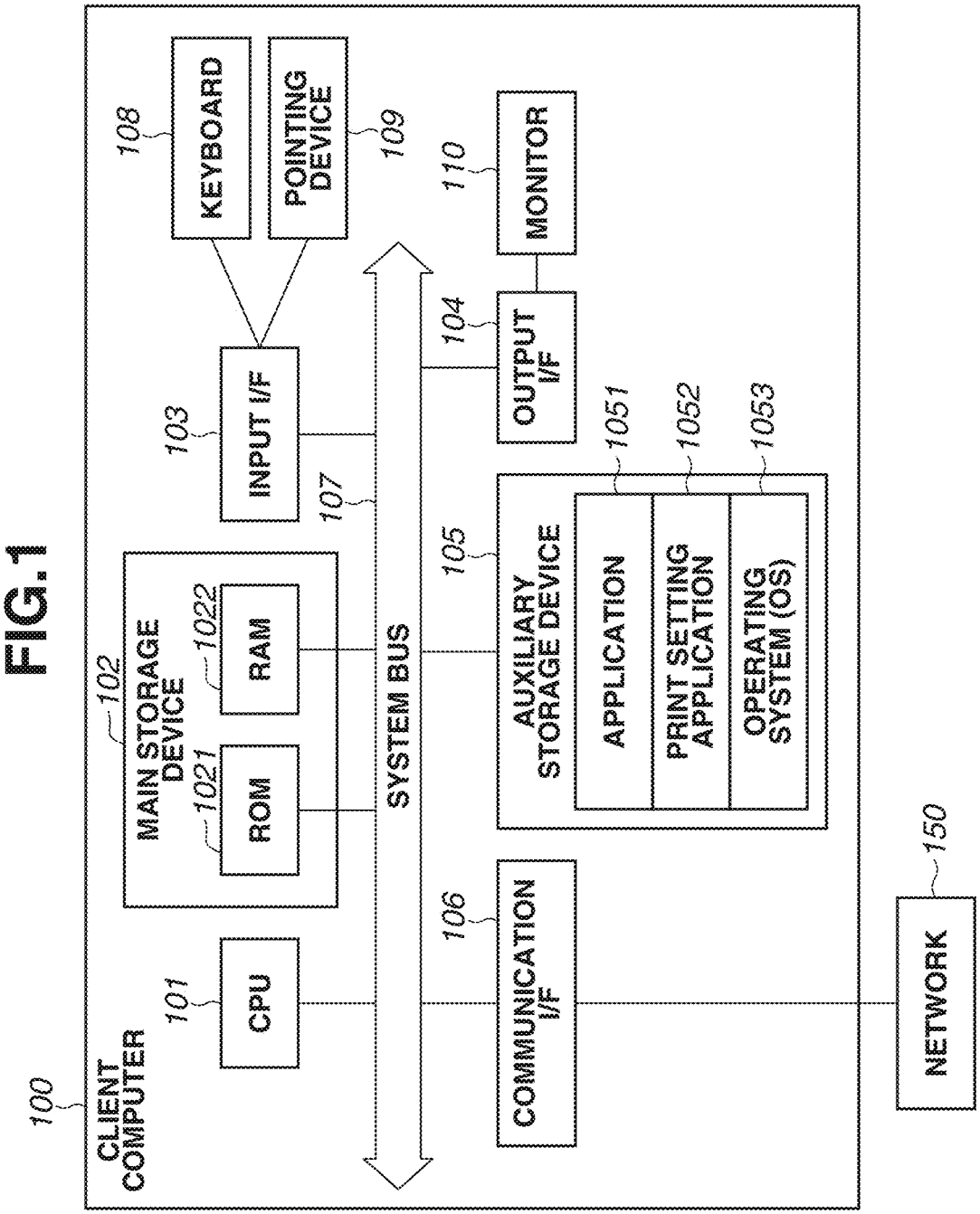
FIG. 1 is a hardware configuration diagram of a client computer.

FIG. 1 is a hardware configuration diagram of a general computer (an information processing apparatus) according to a first exemplary embodiment of the present disclosure. Unless otherwise noted, the present disclosure can be applied to a single function, a system including a plurality of devices, and a system which is connected via a network and performs processing, as long as they can execute functions of the present disclosure. A client computer 100 is configured with a system illustrated in FIG. 1. The configuration is described in detail below.

A central processing unit (CPU) 101 controls an entire apparatus according to a program stored in a read-only memory (ROM) 1021 or a random access memory (RAM) 1022 in a main storage device 102, or stored in an auxiliary storage device 105.

The RAM 1022 is also used as a work area for the CPU 101 to perform various types of processing. The auxiliary storage device 105 stores an operating system (OS) 1053, an application 1051, a print setting application 1052, and the like therein. In the following descriptions, the main storage device 102 and the auxiliary storage device 105 are collectively described as a storage device.

Input devices such as a pointing device 109 typified by a mouse or a touch panel and a keyboard 108 are connected via an input interface (I/F) 103 and used by a user to input various instructions to the computer 100.

An output I/F 104 is an interface for outputting data to the outside and outputs data to an output device such as a monitor 110.

The client computer 100 is connected to a printer 200 via a communication/F 106 and a network 150. A system bus 107 is a common data system bus and enables interfaces and modules to exchange data therebetween. In addition, the CPU 101 executes processing based on a program stored in the storage device, and thus processing in steps in sequence diagrams described below is realized.

Figure 2:
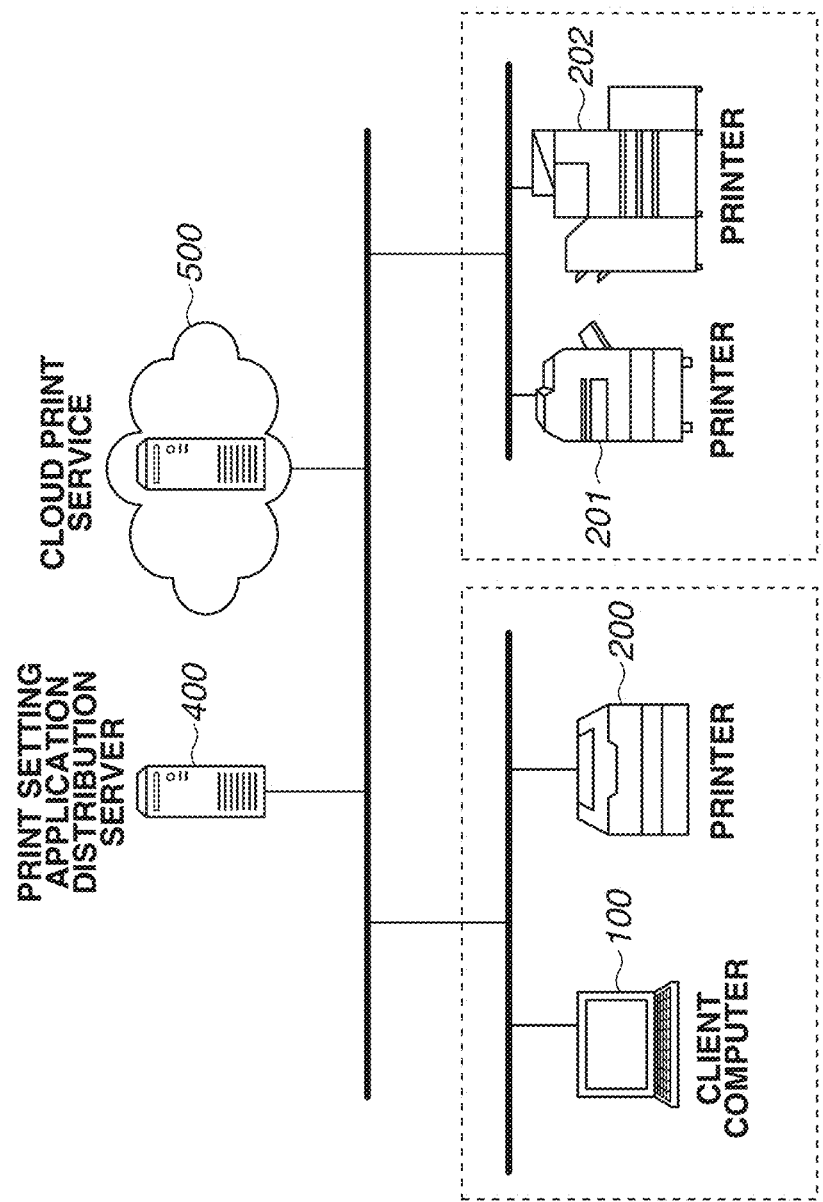
FIG. 2 is a network configuration diagram according to an exemplary embodiment.

FIG. 2 is a network configuration diagram simply illustrating an environment of the network 150 according to the present exemplary embodiment of the present disclosure. The client computer 100 and the printer 200 are connected to the network 150, which are configured with the same intra-network and in a communicable state. Further, a printer 201 and a printer 202, which are connected to another intranet, are connected to the network 150 via the Internet. A print setting application distribution server 400 is connected to the network 150, and thus a system capable of providing the client computer 100 with the print setting application 1052 is established.

A cloud print service 500 is a cloud print service on the Internet that is established on a cloud as a server system including a plurality of servers (in other words, on a server system). According to the present exemplary embodiment, the cloud print service 500 can connect to each intranet and can connect to the client computer 100 and the printers 200, 201, and 202 via the Internet.

The cloud print service 500 manages an account using a user identification (ID) and a password, and a user can access the cloud print service 500 using the account. An account managed according to a user can be associated with a login user of the operating system 1053. In this case, there is no need for the user to input the user ID and the password.

Figure 3:
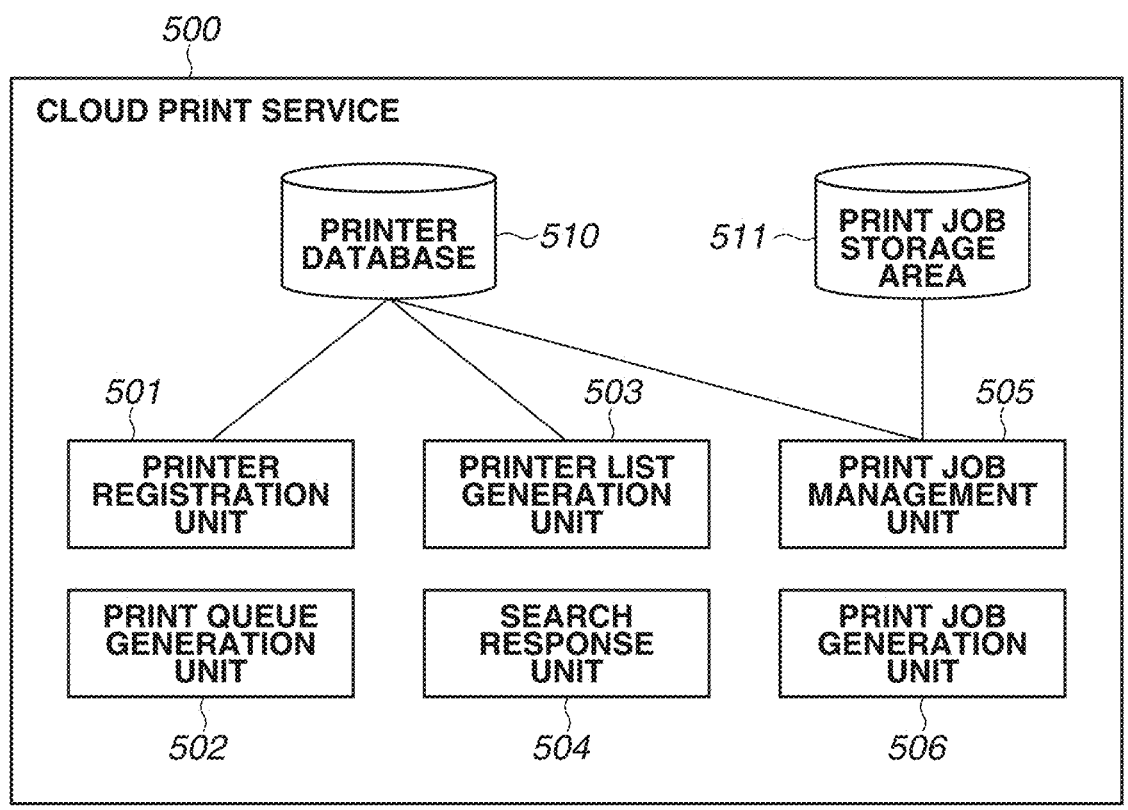
FIG. 3 is a functional block diagram of a cloud print service.

FIG. 3 is a block diagram illustrating the cloud print service 500 according to the present exemplary embodiment of the present disclosure. The cloud print service 500 is a service existing on the cloud via the Internet and can provide a function related to printing. According to the present exemplary embodiment, the cloud print service 500 includes functions of a printer registration unit 501, a print queue generation unit 502, a printer list generation unit 503, a search response unit 504, and a printer database 510. Further, the cloud print service 500 includes functions of a print job management unit 505, a print job generation unit 506, and a print job storage area 511. These functions can be included in another cloud print service that cooperates with the cloud print service 500. The printer 200 is described below as an example, but the printers 201 and 202, which can connect to the cloud print service 500, can realize similar processing.

In a case where the printer 200 instructs the printer registration unit 501 to register a printer, the printer registration unit 501 causes the print queue generation unit 502 to generate a print queue and registers the generated print queue in the printer database 510 in association with printer identification information. A fact that the print queue and the printer identification information of the printer are registered in association with each other is described as that the printer is registered. The present processing is described below with reference to a sequence diagram in FIG. 4.

The print job management unit 505 receives a print job from the client computer 100 and transmits the print job directly to the printer 200 depending on a situation. Alternatively, the print job management unit 505 temporarily stores the print job in the print job storage area 511, transfers the print job to the print job generation unit 506 at a timing when the printer as an output destination determines, and the print job generation unit 506 transmits the print job to the printer 200 by converting it into a suitable file. Processing for transmitting or storing the print job is described below with reference to a flowchart in FIG. 9.

Figure 4:
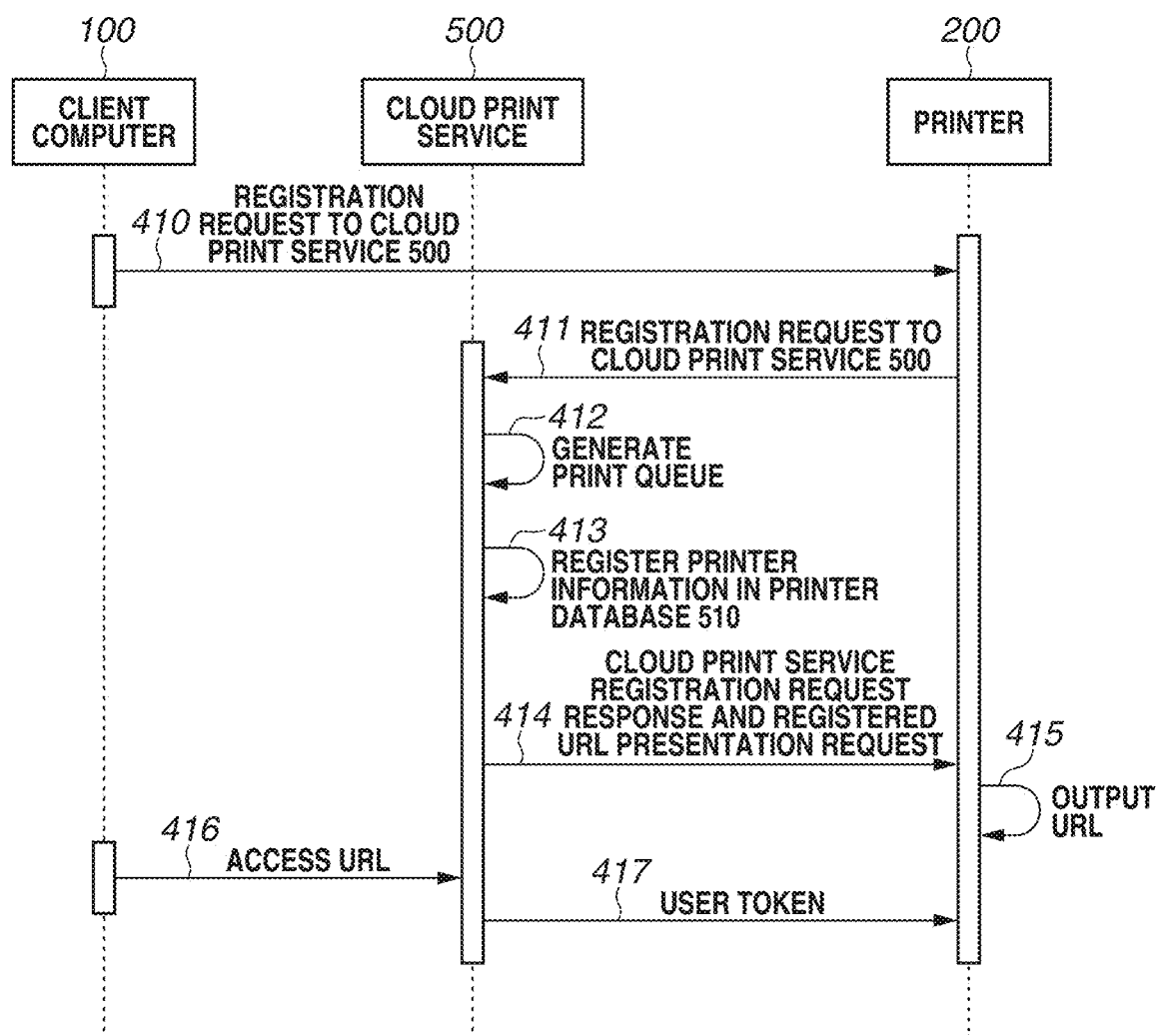
FIG. 4 is a sequence diagram for registering a printer in the cloud print service.

FIG. 4 is a sequence diagram illustrating processing for registering the printer 200 in the cloud print service 500 according to the present exemplary embodiment of the present disclosure.

The printer 200 supports a cloud print function (a function of receiving a print job from the cloud print service and performing printing) and a Web user interface (UI) function of operating the printer 200. The Web UI function is a function of generating a UI and releasing the UI on the network. The client computer 100 supports a cloud print client function (a function of transmitting a file to the cloud print service) and a Web UI client (for example, a Web browser) for operating the Web UI. The cloud print service 500 represents a cloud print service on the Internet.

A user first opens the Web UI of the printer 200 using the Web UI client of the client computer 100, and then selects a button for registering the printer in the cloud print service 500 on the Web UI. When the button is selected, the client computer 100 transmits a cloud print service registration request 410 to the printer 200. Upon receiving the cloud print service registration request 410, the printer 200 transmits a cloud print service registration request 411 to the cloud print service 500. As described above, according to the present exemplary embodiment, a registration request is transmitted from the Web UI client of the client computer 100. However, if the registration request can be transmitted with an operation of an input device attached to the printer 200, such as a panel, it is not necessary to transmit the request from the client computer 100. The cloud print service registration request 410 is accompanied with information about the printer 200. The information about the printer 200 includes, for example, a name of the printer 200, a number for identifying a model of the printer (hardware identification (HWID)), a number for identifying a type of the printer (CategoryID), and Internet Protocol (IP) address information. Particularly, the number for identifying the type of the printer (CategoryID) is information for identifying a model defined by a vendor manufacturing the printer.

In a case where the cloud print service registration request 411 is received, in a flow 412, the cloud print service 500 causes the print queue generation unit 502 to generate a print queue for transmitting the print job to the printer 200. The print queue is generated using the name of the printer (device name), the HWID for identifying the model of the printer, the CategoryID for identifying the type of the printer, and the IP address of the printer, which are the received information about the printer 200. In a flow 413, the cloud print service 500 registers the information about the printer 200 in the printer database 510. The processing for generating the print queue in the flow 412 and processing for registering the information about the printer 200 in the printer database 510 are described in detail below with reference to a flowchart in FIG. 6.

FIG. 5 is an example of the printer database 510 including information about printers stored in the cloud print service 500. The device name indicates the name of the printer (device name) obtained from the printer 200 at a time of registration. The HWID indicates an identifier used for identifying the model of the printer 200 (an identifier specific to a model, namely, identification information specific to an image forming apparatus). The CategoryID indicates an identifier common to a plurality of devices (common identification information). For example, an identifier common to venders and an identifier common to each type of a multifunction peripheral and a printer in the vendor can be registered as the CategoryID. The IP address indicates an IP address of the printer 200 as a connection destination.

In a case where registration in the printer database 510 is completed, the cloud print service 500 transmits a cloud print service registration request response and registered Uniform Resource Locator (URL) presentation request 414 including a registered URL for cloud print registration to the printer 200. In a case where the cloud print service registration request response and registered URL presentation request 414 is received, in a flow 415, the printer 200 notifies a user of registered URL information by displaying the registered URL information on the panel attached thereto or outputting a sheet on which the registered URL information is written. In addition, the printer 200 may notify the client computer 100 of the registered URL information via the Web UI.

The user performs an access 416 to the cloud print service 500 located on the registered URL presented by the printer 200. In this case, the user is required to have logged into a cloud account that can access the cloud print service 500, and thus is required to input the user ID and the password.

The cloud print service 500 associates the user with the printer 200 from the registered URL including the cloud account and the printer information. As an associating method, for example, there is a method for associating the printer information with a user token 417. However, the associating method is not limited thereto. The user token 417 including information about the cloud print service 500 is transmitted to the printer 200, and registration processing of the printer 200 in the cloud print service 500 ends. A method for providing print setting change means suitable for the printer 200 to the client computer 100 is described below with reference to FIG. 8.

Figure 6:
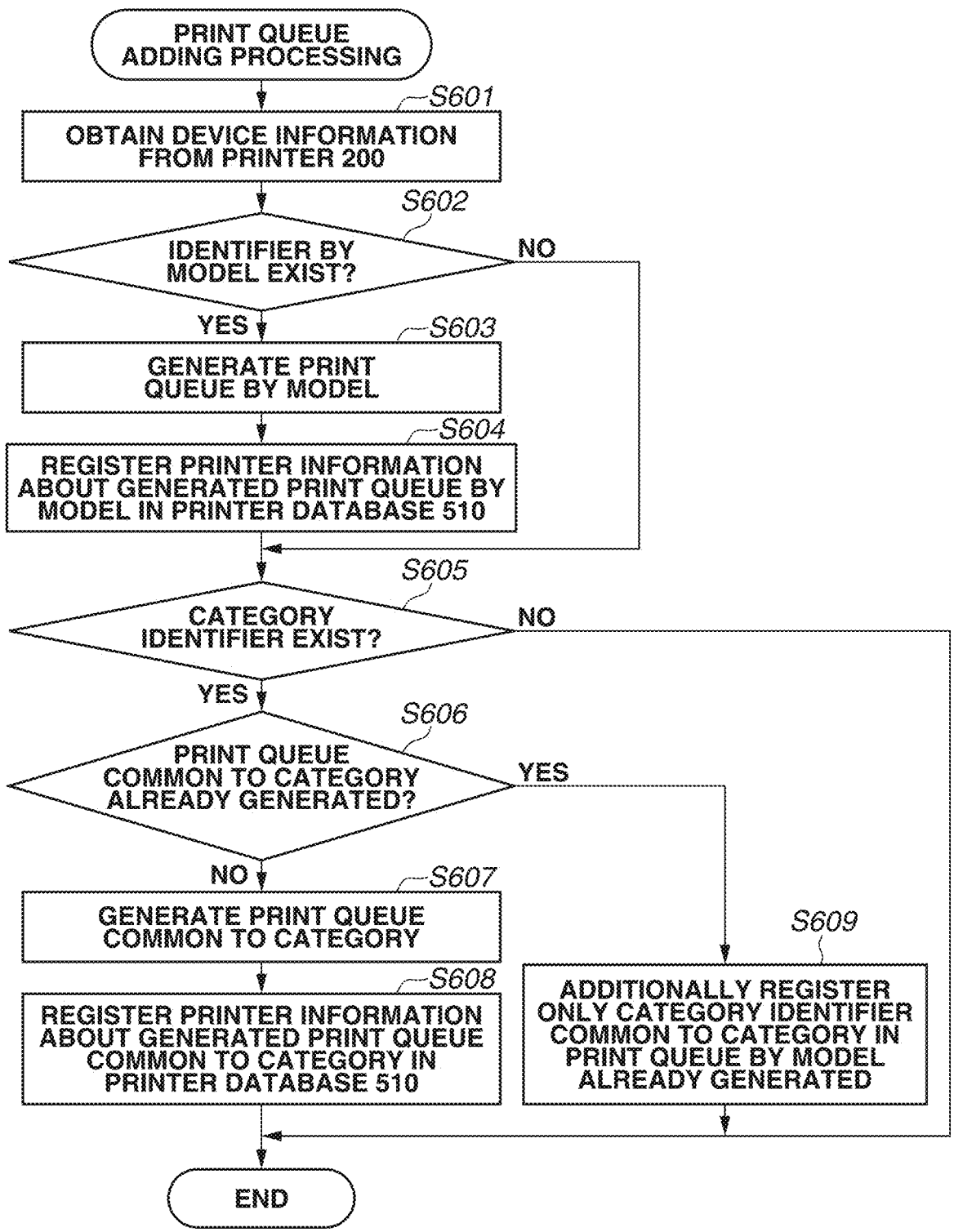
FIG. 6 is a flowchart illustrating processing for generating a print queue and registering information about the printer in a printer database in the cloud print service.

FIG. 6 is a flowchart illustrating processing for generating a print queue (the flow 412 in FIG. 4) and further registering the information about the printer in the printer database 510 (the flow 413 in FIG. 4) by the cloud print service 500 according to the present exemplary embodiment of the present disclosure. Unless otherwise specified, the present processing is performed by each processing unit in the cloud print service 500. The present processing starts at a timing of transmission of the cloud print service registration request 411 from the printer 200 to the cloud print service 500 described in FIG. 4. In step S601, the print queue generation unit 502 obtains device information from the printer 200 as a request source. Regarding obtainment of the device information, it is assumed that the information is obtained from the printer 200 via the network 150 using bidirectional communication. Further, regarding a content of the information, it is assumed that the information is obtained in an Extensible Markup Language (XML) schema illustrated in FIG. 7 as an example, but it goes without saying that the information is not limited thereto. The name of the printer (device name), the HWID, and the CategoryID described in FIG. 5 are obtained from information mainly defined in "<p:DeviId>" 700 in the schema in FIG. 7. In step S602, the print queue generation unit 502 checks whether the obtained device information includes an identifier by model (HWID). Specifically, the print queue generation unit 502 determines whether a defined value exists in "MDL" 701 defined in "<p:DeviId>" 700 in the schema in FIG. 7. In a case where the identifier by model does not exist (NO in step S602), the print queue generation unit 502 advances the processing to step S605 without generating a print queue. In a case where the identifier by model exists (YES in step S602), in step S603, the print queue generation unit 502 generates a print queue by model. In step S604, the printer registration unit 501 registers the printer information about the generated print queue by model in the printer database 510. A device named "Can iR-ADV CCCC" in FIG. 5 includes an identifier by model and thus is registered by this processing. In step S605, the print queue generation unit 502 checks whether the device information previously obtained includes a category identifier (CategoryID). Specifically, the print queue generation unit 502 determines whether a defined value exists in "CID" 702 defined in "<p:DeviId>" 700 in the schema in FIG. 7. In a case where the category identifier does not exist (NO in step S605), the print queue generation unit 502 terminates generation processing and registration processing of the print queue. In a case where the category identifier exists (YES in step S605), in step S606, the print queue generation unit 502 checks whether a print queue common to the category identifier is already generated. In a case where the print queue common to the category identifier is not generated yet (NO in step S606), in step S607, the print queue generation unit 502 generates the print queue common to the category. In step S608, the printer registration unit 501 registers the printer information about the generated print queue common to the category in the printer database 510. A device named "Can OIP Common Printer" in FIG. 5 does not include an identifier by model and thus is registered by this processing. In a case where the print queue common to the category identifier is already generated (YES in step S606), in step S609, the printer registration unit 501 additionally registers only the category identifier common to the category in the print queue by model previously generated.

FIG. 8 is a sequence diagram illustrating processing for installing the print setting application 1052 on the client computer 100 according to the present exemplary embodiment of the present disclosure.

In a case where the client computer 100 performs output to the printer 200 using the cloud print, the client computer 100 transmits a print job to the cloud print service 500. Therefore, it is necessary to generate a print queue for transmitting the print job to the cloud print service 500 in the client computer 100.

According to the present exemplary embodiment, a printer search function is used, which is a standard function included in the operating system 1053. In a case where a printer is searched for, a printer on the same intranet is generally regarded as a target. For example, in FIG. 2, in a case where the client computer 100 searches for a printer, the client computer 100 can find the printer 200 but cannot find the printer 201 and the printer 202 beyond the intranet. However, according to the present exemplary embodiment, the client computer 100 can access the cloud print service 500. Accordingly, in a case where a printer is registered in the cloud print service 500, the client computer 100 can find the registered printer by the printer search. According to the present exemplary embodiment, it is assumed that the printers 201 and 202 are registered in the cloud print service 500.

The client computer 100 performs printer search 810, which is the standard function of the operating system 1053 described above. When information about the printer search 810 is received, the search response unit 504 in the cloud print service 500 presents an available printer to the client computer 100. Therefore, the cloud print service 500 performs generation 811 of a printer list including information about a connectable printer. The printer information is the name of the printer (device name), the HWID for identifying the model of the printer, and the IP address of the printer described above. The printer list including the printer information is generated by the printer list generation unit 503 in the cloud print service 500 using the information in the printer database 510.

The cloud print service 500 returns a response 812 of the generated printer list to the client computer 100. At this time, the cloud print service 500 transmits the response by associating information about the HWID, which is the printer identification information described in FIG. 5, with the printer information included in the printer list. The client computer 100 presents an option of the available printer to a user based on the printer list. The user selects a model from the presented printer list. When the user makes the selection, in a flow 813, the operating system 1053 in the client computer 100 generates a print queue of the model.

Further, in a case where the print queue is successfully generated, the operating system 1053 in the client computer 100 transmits a download request 814 to the print setting application distribution server 400. At this time, the operating system 1053 transmits the download request 814 of the print setting application 1052 associated with the HWID as identification information of a target printer. According to the present exemplary embodiment, the HWID included in the printer information is associated with the print setting application 1052 one to one in the print setting application distribution server 400. A specific HWID is uniquely associated with a corresponding print setting application 1052.

The print setting application distribution server 400 can store metadata where association information about the print setting application 1052 and the HWID included in the printer information are described. In this case, a suitable print setting application 1052 is downloaded using the metadata.

In a case where the download request 814 is received, the print setting application distribution server 400 performs download processing 815 on the client computer 100. More specifically, the print setting application distribution server 400 transmits the print setting application 1052 to the client computer 100. Subsequently, the client computer 100 performs installation 816 of the print setting application 1052 thereon.

After the installation, the print setting application 1052 is associated with the printer 200 one to one. Therefore, the client computer 100 stores model information and print setting information of the printer 200, and thus can present a suitable print setting UI to the user. Alternatively, the print setting application 1052 can communicate with the cloud print service 500, obtain target model information and print setting information, and provide a UI using the obtained information. When the installation of the print setting application 1052 is completed, the user can use detail print setting change.

Figure 15:
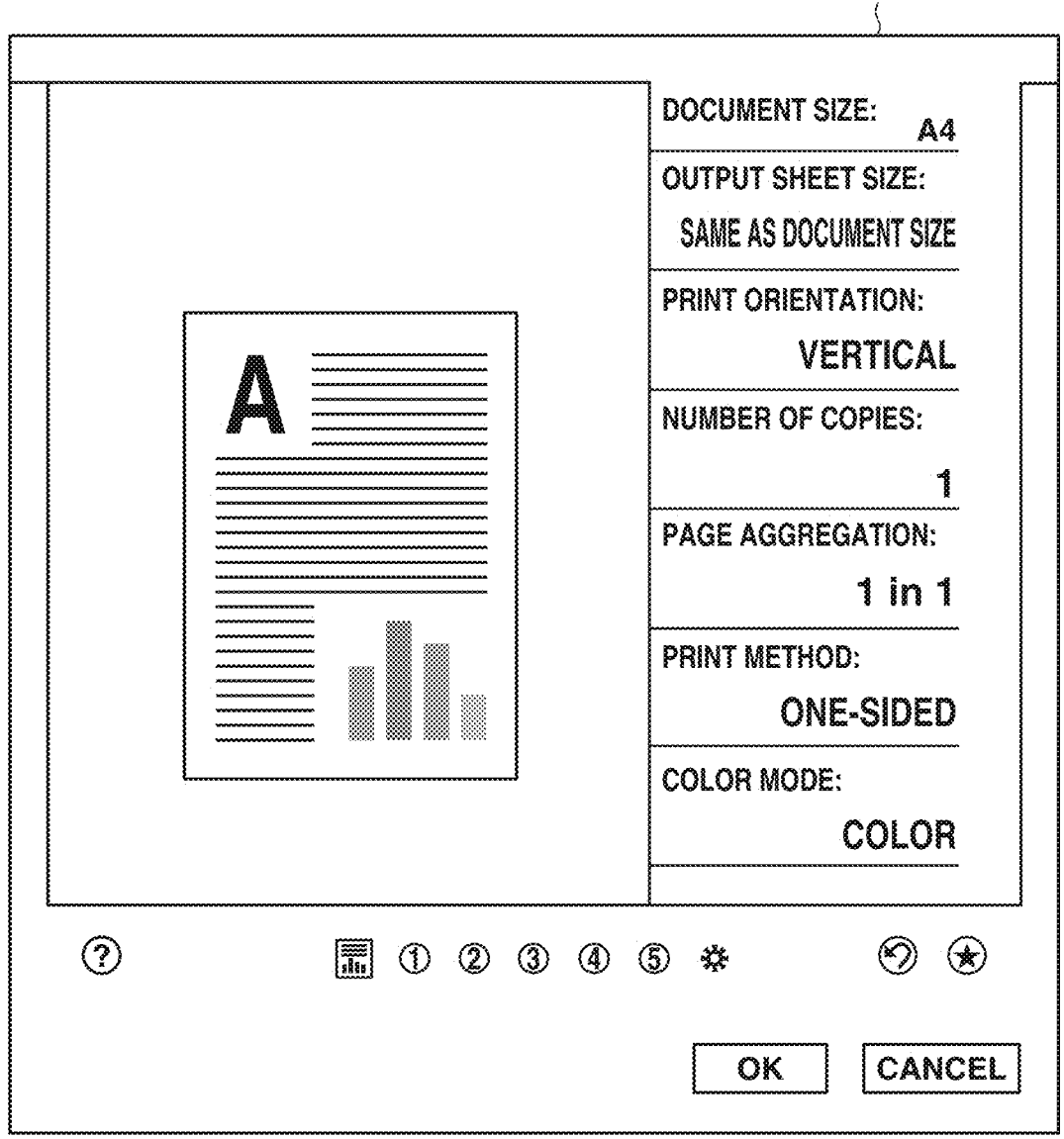
FIG. 15 illustrates an example of a user interface (UI) for changing a print setting.

In a case where a user uses the cloud print, the user instructs printing from the application 1051 of the client computer 100. As a specific example, the user presses "print" from a file menu of the application. As a general operation of the application 1051, in a case where a print instruction is received from the user, the application 1051 instructs the OS 1053 to display a print common dialogue (a print setting screen provided by the OS 1053). The OS 1053 displays the print common dialogue upon receiving the instruction from the application 1051. The print common dialogue displayed by the OS 1053 enables a user to view a list of the printers installed on the client computer 100, to specify a page to be printed, and to set a number of copies. The user selects a print queue of the printer that the user wants to use for output from the print common dialogue, and presses a detail setting button (an object) displayed on the same screen to instruct the print queue to change the print setting. In this case, the installed print setting application 1052 is started, and a print setting UI (1500 in FIG. 15) is displayed. The user can change various print settings as illustrated in the print setting UI 1500 in FIG. 15. (Of course, the UI can be configured to be able to change more print settings, for example, settings for image processing such as density and color tint, whether to combine a stamp, and settings of a punch position and a staple position.) In a case where the user changes the print setting on the print setting UI and issues a print instruction, the print setting application 1052 transmits data to be printed to the cloud print service 500.

Figure 9:
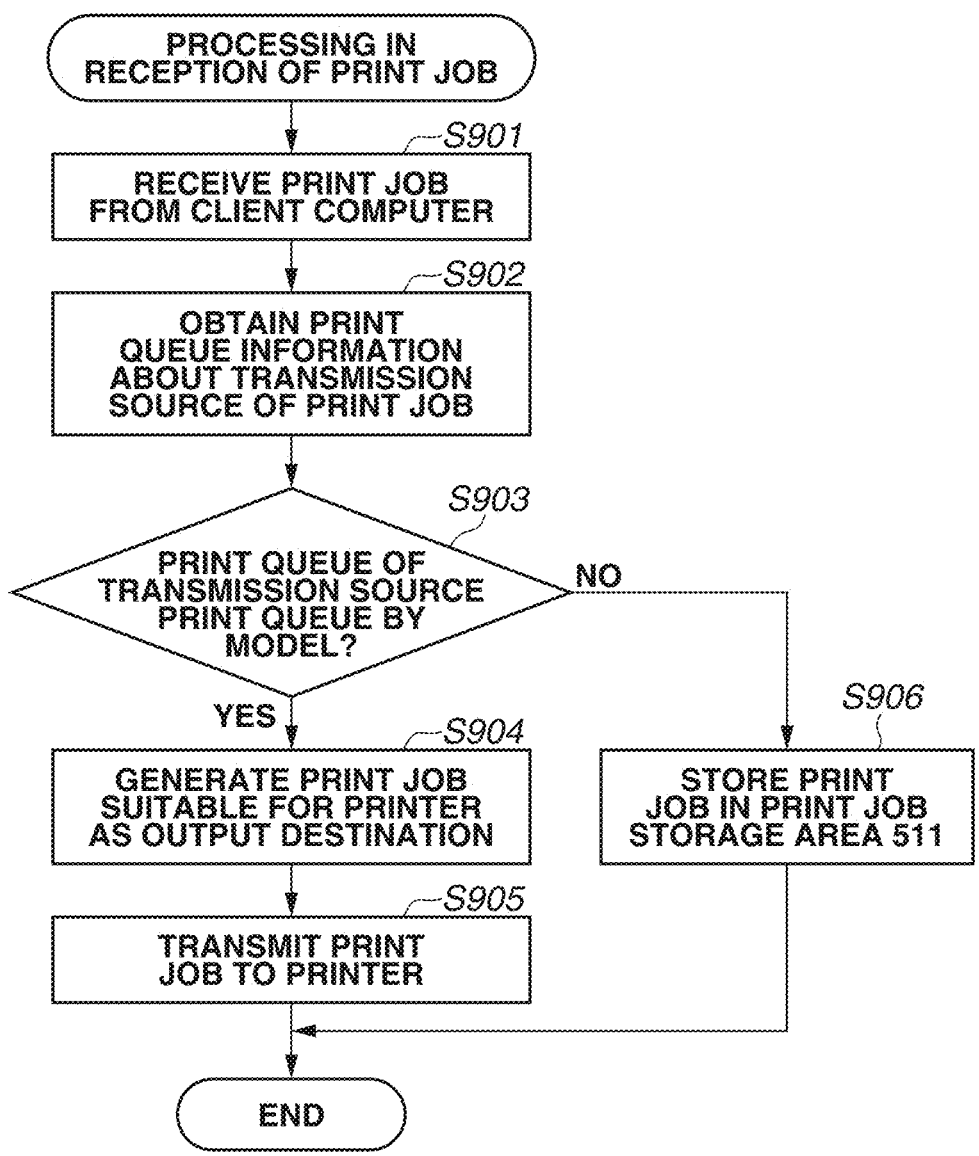
FIG. 9 is a flowchart illustrating processing performed by the cloud print service in a case where a print job is received from the client computer.

FIG. 9 is a flowchart illustrating processing performed by the cloud print service 500 in a case where it receives a print job from the client computer 100. Unless otherwise specified, the present processing is performed by each processing unit in the cloud print service 500. In step S901, the cloud print service 500 receives a print job from the client computer 100. In step S902, the print job management unit 505 obtains print queue information about a transmission source of the print job. As a method for obtaining the print queue information, there is a method for identifying the print queue from print job information. However, the method is not limited thereto. In step S903, in a case where the print queue information is obtained, the print job management unit 505 determines whether the print queue is a print queue by model or a print queue common to the category. A determination method can be performed in such a manner that, for example, corresponding printer information is obtained from the printer information list in FIG. 5, and the print queue information is determined whether to include the identifier by model (HWID) of the obtained printer information. In a case where the print queue is the print queue by model (YES in step S903), in step S904, the print job generation unit 506 generates a print job suitable for the printer as the output destination. In step S905, in response to completion of the generation, the print job generation unit 506 transmits the generated print job to the designated printer. In a case where the print queue is the print queue common to the category (NO in step S903), in step S906, the print job is stored in the print job storage area 511. In this case, the print job is not automatically transmitted to the printer. Only after a print job obtainment request (namely, a transmission request) is received from the printer, the print job is transmitted to the printer as a response to the transmission request. FIG. 10 illustrates an example of a print job database that is stored in the print job storage area 511 in the cloud print service 500. A print job ID is stored in association with the print job name and the CategoryID of the print queue in the print job database.

Figure 11:
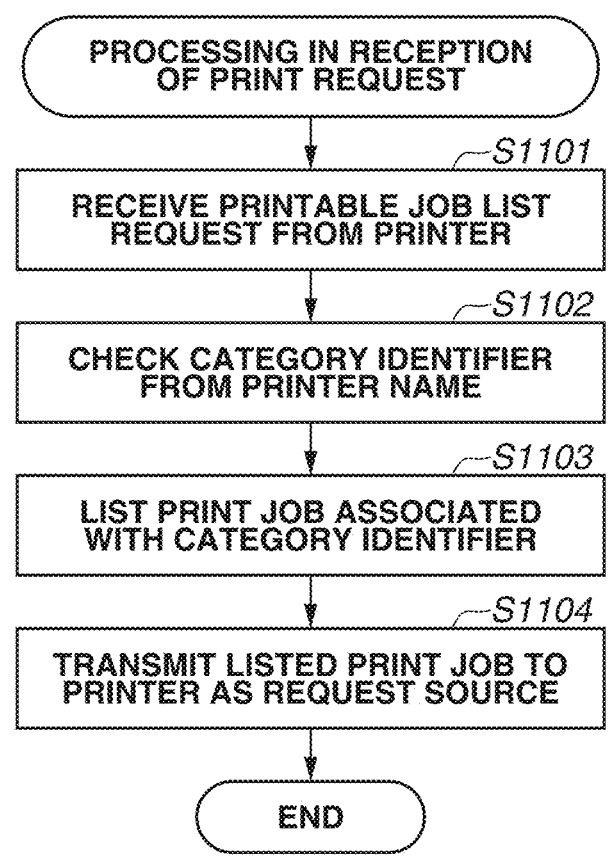
FIG. 11 is a flowchart illustrating processing in a case where the cloud print service receives a printable job list request from the printer.

FIG. 11 is a flowchart illustrating processing performed by the cloud print service 500 in a case where it receives a printable job list request from the printer 200. Unless otherwise specified, the present processing is performed by each processing unit in the cloud print service 500. In step S1101, the cloud print service 500 receives a printable job list request from the printer 200. The printable job list request includes a printer name. In step S1102, the print job management unit 505, which receives the request, obtains a category identifier from the printer name. Particularly, the print job management unit 505 refers to the printer database 510 and obtains a category identifier (CategoryID) associated with the printer name (device name). In step S103, the print job management unit 505 lists the print job associated with the obtained category identifier therefrom. Particularly, the print job management unit 505 lists the print job associated with the category identifier (CategoryID) from a database in the print job storage area 511. FIG. 12 illustrates an example of a result list obtained by searching the print job database in FIG. 10 for a print job, which is printable by the printer 200 as a printable job list request source, and listing the print job. In step S1104, the generated print job list (for example, the list in FIG. 12) is transmitted to the printer 200 as the request source.

Upon receiving the transmitted printable job list, the printer 200 displays the print job list on an operation panel. FIG. 13 illustrates an example of the operation panel on which the printable job list received from the cloud print service 500 is displayed. A user selects a desired print job on the operation panel and presses a print button to execute printing. The printer 200, which receives execution of printing, transmits a print job obtainment request to the cloud print service 500. The print job obtainment request includes an ID of the print job to be obtained, namely, the print job ID.

Figure 14:
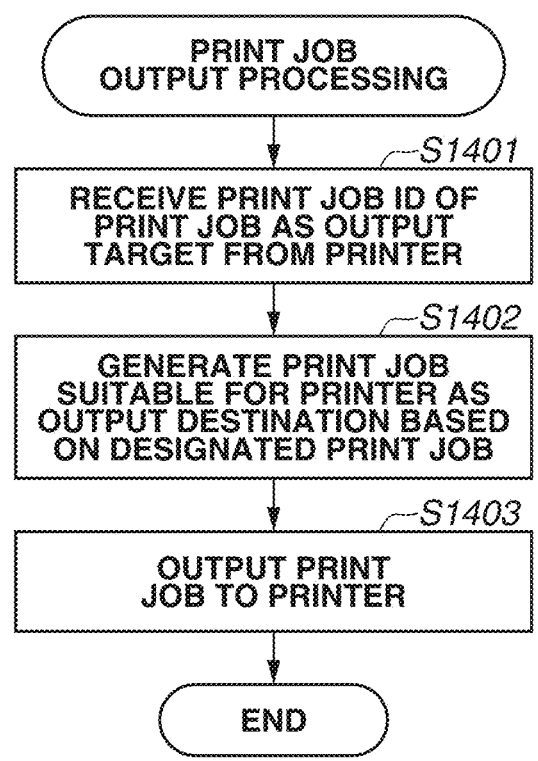
FIG. 14 is a flowchart illustrating processing in a case where the cloud print service receives a print execution request from the printer.

FIG. 14 is a flowchart illustrating processing performed by the cloud print service 500 according to the present exemplary embodiment of the present disclosure in a case where the cloud print service 500 receives the print job obtainment request from the printer 200. Unless otherwise specified, the present processing is performed by each processing unit in the cloud print service 500. In step S1401, the print job management unit 505 receives the print job obtainment request (including the print job ID of the print job as an output target) from the printer 200. In step S1402, the print job management unit 505, which receives the request, generates a print job suitable for the printer 200 as the output destination based on the designated print job. In step S1403, upon completion of generation of the print job, the print job is output to the printer 200 as a print request source.

According to the above-described measures, a framework can be provided in which a print job is uploaded to the cloud, and the image forming apparatus obtains the print job by performing authentication with respect to the cloud.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-088594, filed May 8, 2019, which is hereby incorporated by reference herein in its entirety.

What is claimed is:

1. A server system comprising:
an obtainment unit configured to obtain identification information common to a plurality of image forming apparatuses from a first image forming apparatus; and
a generation unit configured to generate a print queue associated with the obtained identification information,
wherein the obtainment unit obtains identification information same as the identification information from a second image forming apparatus, which is different from the first image forming apparatus, and
wherein the server system further comprises a transmission unit configured to transmit information about a print job managed by the generated print queue to the second image forming apparatus from which the obtainment unit obtains the same identification information.

2. The server system according to claim 1,
wherein the transmission unit transmits a name of the print job,
wherein the server system further comprises a reception unit configured to receive a transmission request of the print job transmitted by the second image forming apparatus based on an event that a user selects the name of the print job in the second image forming apparatus, and
wherein the transmission unit transmits the print job to the second image forming apparatus as a response to the received transmission request.

3. The server system according to claim 1,
wherein the obtainment unit obtains the identification information common to the plurality of image forming apparatuses and second identification information specific to the first image forming apparatus from the first image forming apparatus,
wherein the generation unit generates the print queue based on the obtained identification information common to the plurality of image forming apparatuses and a second print queue based on the obtained second identification information,
wherein the print queue manages a print job to be transmitted to an image forming apparatus based on an event that a user selects a name of the print job in the image forming apparatus, and
wherein the second print queue manages a print job to be transmitted to an image forming apparatus without selection of a name of the print job by a user in the image forming apparatus.

4. A server system comprising:
an obtainment unit configured to obtain common identification information common to a plurality of image forming apparatuses from a first image forming apparatus; and
a generation unit configured to generate a print queue associated with the obtained common identification information and first identification information specific to a model of the first image forming apparatus,
wherein the obtainment unit obtains the common identification information and second identification information specific to a model of a second image forming apparatus from the second image forming apparatus, which is different from the first image forming apparatus, and
wherein the server system further comprises an association unit configured to associate the second identification information obtained by the obtainment unit with the print queue.

5. A method for controlling a server system, the method comprising:
obtaining identification information common to a plurality of image forming apparatuses from a first image forming apparatus; and
generating a print queue associated with the obtained identification information,
wherein the obtaining obtains identification information same as the identification information from a second image forming apparatus, which is different from the first image forming apparatus, and
wherein the method further comprises transmitting information about a print job managed by the generated print queue to the second image forming apparatus from which the same identification information is obtained in the obtaining.

6. The method according to claim 5, further comprising:

transmitting a name of the print job; and receiving a transmission request of the print job transmitted by the second image forming apparatus based on an event that a user selects the name of the print job in the second image forming apparatus;

wherein the transmitting transmits the print job to the second image forming apparatus as a response to the received transmission request.

7. The method according to claim 5, wherein the generating generates the print queue based on the obtained identification information common to the plurality of image forming apparatuses and a second print queue based on the obtained second identification information, wherein the print queue manages a print job to be transmitted to an image forming apparatus based on an event that a user selects a name of the print job in the image forming apparatus, and wherein the second print queue manages a print job to be transmitted to an image forming apparatus without selection of a name of the print job by a user in the image forming apparatus.

\* \* \* \* \*